Figure 1:
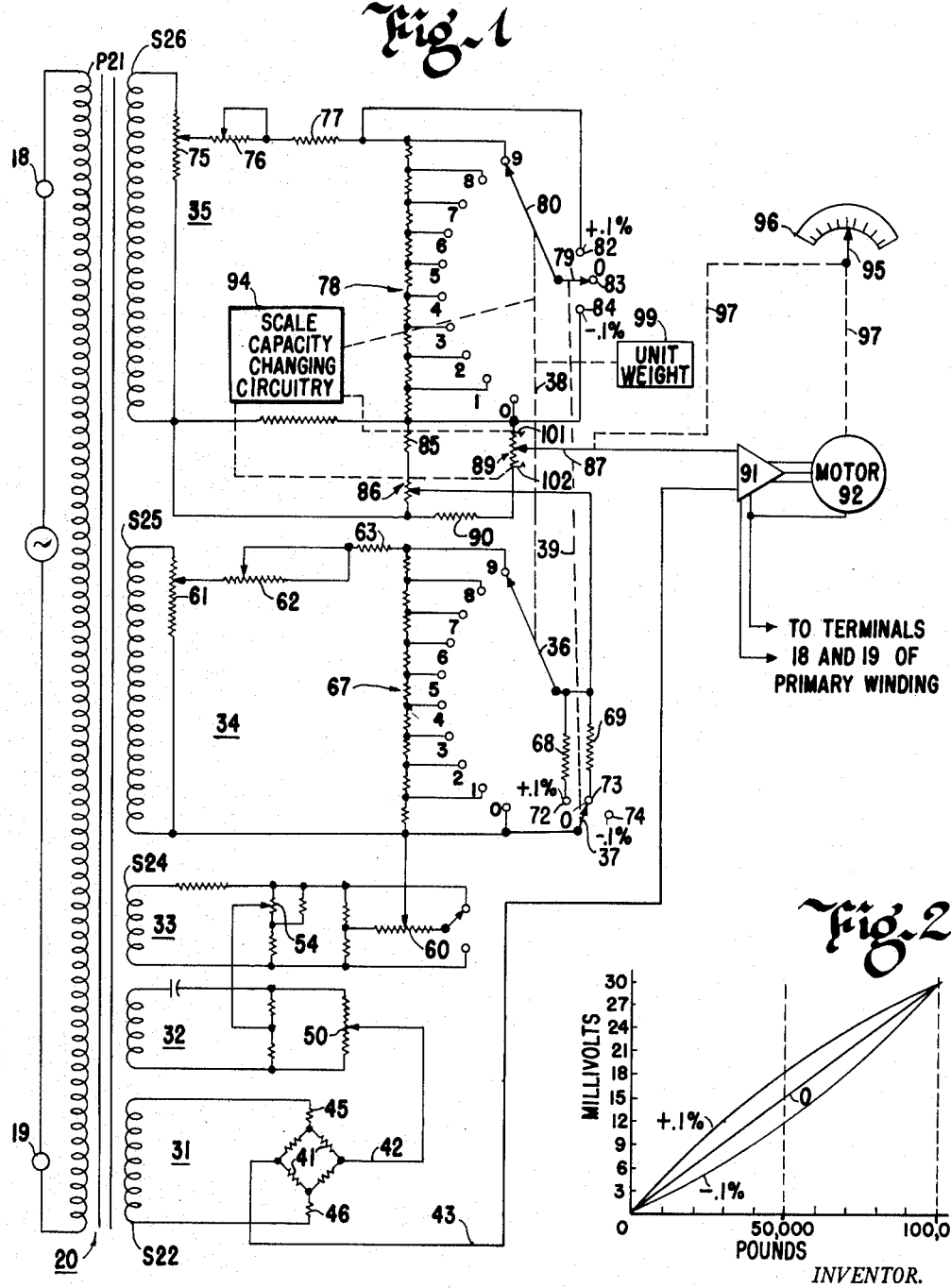

INVENTOR.
ROBERT D. KOHLER
BY
Marshall, Wilson & Yeasting
—attorneys—

United States Patent Office 3,221,829
Patented Dec. 7, 1965

3,221,829
VOLTAGE BALANCING CIRCUIT
Robert D. Kohler, Temperance, Mich., assignor to Toledo Scale Corporation, Toledo, Ohio, a corporation of Ohio
Filed Jan. 13, 1964, Ser. No. 337,431
6 Claims. (Cl. 177—210)

This invention relates to load responsive devices and in particular to a voltage balancing circuit to be used therewith.

In weighing scales wherein load cells are employed as counterforce mechanisms it has been customary to employ strain gages to convert the deflection experienced by the load cell, the deflection being proportional to the load applied to the load cell, into an appropriate voltage. However, it then becomes necessary to provide appropriate voltage counterbalancing circuitry to convert the load cell, or transducer, voltage output to a dial reading indicative of the load being weighed. Accordingly, various prior art schemes for forming a counterbalancing voltage network which includes the electrical strain gage in circuit with a variable voltage generating means, the voltage generating means being in phase opposition to the output of the transducer, have been attempted. The prior art means used to generate the variable voltage which is in phase opposition to the output strain gage voltage has included a plurality of adjustable scale capacity changing potentiometers, and a plurality of adjustable span potentiometers which are necessary to insure that the scale potentiometer will have the proper voltage between its zero to full chart positions for the particular range step that is next approaching, see U.S. Patent No. 2,944,808 issued July 12, 1960 to C. F. Spademan.

The purpose of the plurality of adjustable scale capacity changing counterbalancing voltage potentiometers and of the span compensating voltage potentiometers is to insure that the counterbalancing voltage generated thereby will conform as close as possible to the output voltage of the transducer. The transducing system may experience linear deflections, and output voltages, for equal variations of load applications, or the deflections may deviate, in a positive or negative direction, from a linear response curve. Accordingly, in order to reduce the dial reading error to as small a figure as possible it is important that the linearity function of the counterbalancing voltage, with reference to the dial indication, be as close as possible, and preferably match, the linearity function of the transducer output voltage with respect to the force applied.

However, while it is possible with prior art systems to accurately match the output voltage function of the counterbalancing voltage circuit with the output voltage function of the transducer this has not always been done because the tedious and time consuming procedure required to carry out the process. Specifically, what is required in the prior art schemes is to place one range step of weight upon the scale platform and measure the output voltage developed by the transducer. The appropriate adjustable span potentiometer associated with the scale potentiometer for the particular range step involved would then have to be adjusted to assure that the full dial deflection corresponds to the above measured voltage. Also, an adjustment would have to be made to the associated scale capacity changing potentiometer, and specifically what would be required is to set the output voltage therefrom to be equal to the incremental output voltage for that particular range.

The above steps will then have to be repeated for each scale capacity changing potentiometer and scale span potentiometer by the incremental addition of weights corresponding to the number of range steps available. Accordingly, if the full load capacity of the load cell was 100,000 pounds, for example, and the scale capacity changing potentiometers along with the scale potentiometer provided ten steps over which the 100,000 pound capacity could be divide, it is obvious that ten settings would be necessary, starting with an initial load of 10,000 pounds and incrementally increasing the loading by an additional 10,000 pounds for each step until the 100,000 pound capacity has been reached.

The above procedure is not only tedious and time consuming, but also poses a major problem in the transportation and handling of large amounts of calibration weights. This weight transportation problem is placed in a proper perspective when it is appreciated that the situs of the scale may be some remotely located industrial location.

My invention is aimed at eliminating the trial and error approach for the setting of the plurality of adjustable scale capacity changing potentiometers as well as the plurality of adjustable span potentiometers associated with the scale potentiometer to achieve a balancing voltage which is of substantially the same linearity function as the output voltage of the transducer.

It is a further object of this invention to permit the calibration of a scale counter-balancing voltage to substantially match that of the load cell strain gage or transduced by a simple and easy switching process.

It is still a further object of this invention to permit the calibration of a balancing voltage to that of a transducer by the use of only one dial's worth of test weights, regardless of the capacity of the load cell.

In accordance with the above and first briefly described I have provided an electrical weighing scale having load cell deflection mechanisms. The load cells have electrical strain gage measuring elements operatively connected thereto to vary the output voltage therefrom in response to changes of loads applied to the load cells. There is also provided an adjustable means which is operable to generate a voltage substantially equal in magnitude, but of opposite phase, to the voltage generated by the load responsive transducing mechanism.

In addition, a scale capacity changing circuit which is manually or automatically operable in response to the adjustable means approaching its limits of counterbalancing voltage to permit the addition or subtraction of discrete predetermined increments of balancing voltage over the entire range of the load cell is provided. There is also provided a selectively variable, counterbalancing voltage shaping means which is connected in circuit with the scale capacity changing means, and which provides a voltage therefrom that is of substantially the same linearity function as that generated by the particular transducer. Accordingly, a balancing voltage will be generated which has substantially the same linearity function and is of opposite phase to the voltage generated by the application of a load, within the transducer's working limits, to the load responsive transducer. Lastly, there is provided a load readout device which is operable in response to the magnitude of the counterbalancing voltage generated to indicate the amount of load applied to the load cell.

Figure 2:
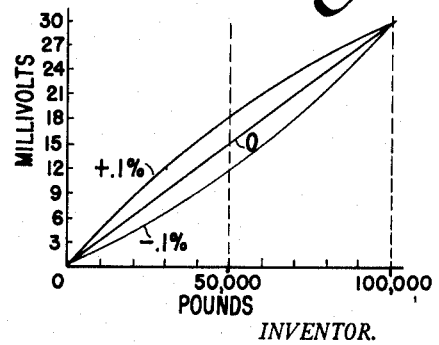

Other objects, features, and advantages of my invention will be disclosed in the following detailed description when read with the accompanying drawings, wherein:

FIG. 1 is a schematic wiring diagram showing the essential components of an electronic weighing scale; and FIG. 2 is a typical family of voltage versus weight curves and indicates the usual range of linearity functions generated by load cell transducing mechanisms in which the magnitude of the error has been greatly exaggerated over that which actually exists in a true scale drawing.

The invention as illustrated in FIG. 1 is applied to a weighing scale system 31 employing load cell actuated strain gages 41 to generate a signal characteristic of a load. The resistance values of strain gages 41, in the individual bridge arms, change with the strains imposed thereon incidental to the distortion due to an applied load on the supporting elements of the load cell. Therefore, when energized from an external source, secondary winding S22, a signal which is a function of the distortion, and hence the load, is generated across the leads labeled 42 and 43. The load cell is of conventional design, and any of the many well-known commercially available types may be used therefor. Further, system 31 may include a single cell or as many additional cells as are necessary may be connected in series to result in a desired weighing scale capacity. System 31 includes the conventional mechanical elements normally associated therewith, which are not shown, such as a load receiver and suitable couplings for transmittal of the strain experienced by the strain gages 41 to the resistance bridge shown in FIG. 1. Also, the current and voltage supplied by secondary winding S22 is maintained at the proper operating level by resistors 45 and 46.

As is well-known, the output voltage from a load cell can assume a plurality of linearity functions. Typically the linearity function of the output voltage from a transducer will be within ±.1% of a straight line response. The typical linearity function curves are shown labeled +.1%, 0, and —.1% at FIG. 2. As shown thereat curve 0 would depict a linear load cell response curve, and accordingly equal increments of load would result in equal increments of output voltage. Curve +.1% represents a positive load cell response curve and indicates that for the application of a particular load an output voltage which is .1% higher in value than that which occurs from a load cell having a linear response curve 0 results. On the other hand, curve —.1% is representative of negative type transducers and accordingly an output voltage would result therefrom which is .1% lower than that which results from the application of the particular load to a load cell having a linear response curve 0.

The output signal from the load cell which is significant is the net change from the unloaded to the loaded condition and, therefore, the bridges are normally adjusted to be essentially in balance with no signal being developed across its output terminals when the load receiver is unloaded. Thus the signal generated across leads 42 and 43 ideally is zero with no load on the system. Moreover, in order to measure the load applied to the load cell, which results in a voltage differential being established between conductors 42 and 43, lead 43 is shown connected to amplifier and motor control device 91. Amplifier 91 functions as an error detection amplifier and furnishes a voltage which has a magnitude that varies in accordance with the difference of the two signals, the voltage from the strain gages 41 and that of the counterbalancing circuit, applied thereto and has a phase which is the same as the phase of the larger magnitude signal.

Amplifier 91 controls the operation of servomotor 92 which in turn positions both indicator 95 and the adjustable arm 87 of adjustable precision scale potentiometer 89 by way of connection 97. Accordingly, as the counterbalancing voltage is varied in a balancing direction amplifier 91 will respond to position adjustable arm 87 until a null voltage, which is the difference between the load cell signal and the counterbalancing voltage, is reached whereupon further movement is impossible. Additional counterbalancing voltage which is also in phase opposition to the resulting voltage from the strain gages 41, the combined voltages forming a control voltage for motor control amplifier 91, is generated by connecting quadrature adjust potentiometer 50, zero adjust potentiometer 60, multitapped scale capacity changing resistor 67 and multitapped span resistor 78 by way respectively of double-decked selector switches 38 and 39, and scale potentiometer 89 in circuit with conductor 42 in a manner as shown in FIG. 1. Further, potentiometer 61, shown to be connected across secondary winding 25, supplies by way of its variably positionable arm, variable resistor 62, and fixed, curve-shaping resistor 63 the operating potential for multitapped range step resistor 67. Likewise the correct voltage across the scale potentiometer 89 for the particular scale capacity and linearity function of the load cell is established by multitapped resistor 78, shown connected across secondary winding S26, variable resistor 76, fixed resistor 77, multitapped span resistor 78, fixed resistor 85, and zero adjust potentiometer 86.

The curve shaping network must be able to conveniently provide a straight line voltage function, a negative voltage function, or a positive voltage function in order to accommodate any of the three possible functions generated by the load cell transducer. Accordingly, as will be explained more fully hereinbelow, the negative curve, corresponding to the minus .1% curve of FIG. 2, is obtained by a judicial choice of the resistance values between taps of multitapped resistor 67. Therefore, the parallel resistors 68 or 69, as well as the series resistor 63, play no part in obtaining a negative voltage function.

However upon placing either loading resistors 68 or 69 in circuit with multitapped resistor 67 a positive voltage function representative of the positive .1% type curve of FIG. 2, or a linear voltage function representative of the zero function will result. Furthermore, whereas resistor 63 was ineffective to provide any voltage shaping when there is no loading resistance in parallel with multitapped resistors 67, this is not true when loading is placed thereat. Accordingly with a loading resistor in parallel with resistor 67, resistor 63 provides additional shaping to the voltage function generated thereat.

Specifically, terminal 72, which would be selected if a + load cell voltage curve is being generated by the load cell, has one end of resistor 68 connected thereto; terminal 73, which is selected when a linear response curve 0 is being generated by the load cell, has one end of resistor 69 connected thereto; and finally, terminal 74, which would be selected if a negative response curve is being generated, has no resistance connected thereto. The other ends of resistors 68 and 69 are joined together and returned to the common point connecting switch arm 36 and the adjustable arm of zero adjust potentiometer 86. The selection of the +, —, or 0 resistance, which choice is determined by the linearity function of the response curve of the load cell, is made by the manual positioning of deck 37 of double-deck switch 39.

Transducing system 31 is supplied with alternating current from the secondary winding S22 of power transformer 20 which has its primary winding P21 connected to a suitable source of alternating current. Also suitable operating potential to the control and excitation windings of servomotor 92 is supplied by connecting them to an alternating current source.

Quadrature adjust potentiometer 50 introduces a quadrature signal which is 90 or 270 electrical degrees out-of-phase with the signal generated by the load cell and thereby cancels the quadrature component of the load cell signal so that amplifier 91 will not be saturated by these components. Also the zero adjust potentiometers 54 and 60, connected in circuit with secondary winding S24 in the manner shown in FIG. 1, provide a voltage which is proportional to the system tare and 180 electrical degrees out-of-phase with the signal from the load cell to thereby further reduce the load cell's signal in accordance with the magnitudes thereof.

Also, range potentiometer 61 is shown to be connected across transformer secondary S25. A series circuit arrangement of variable potentiometer 62, fixed curve shaping resistor 63, and multitapped scale capacity changing resistor 67 is then connected in parallel with range potentiometer 61. Further as shown in FIG. 1, capacity changing resistor 67 is shown having nine fixed taps, which together with scale potentiometer 89 form ten divisions or range steps over which the zero to full load capacity of the load cell can be divided. It should of course be appreciated that the multitapped scale capacity changing resistor 67 can have any number of taps desired as determined by the zero to full load capacity of the load cell and the zero to full load deflection of weight indicating chart 96.

Span potentiometer 75 is operatively connected across secondary winding S26 of transformer 20. The differentially positionable tap of span potentiometer 75 is then connected in circuit with potentiometer 76, fixed resistor 77, multitapped resistor 78, fixed resistor 85, and zero adjust potentiometer 86 across the potentiometer 75. Further, precision potentiometer 89 and fixed resistor 90 form a series circuit across resistor 85 and zero potentiometer 86.

I shall now describe my voltage balancing circuit in more detail. Specifically, since it is desired that the weighing scale have a high sensitivity and a high capacity it is obvious that the scale potentiometer 89 cannot be the sole counterbalancing voltage source to oppose the voltage generated by the strain gages 41, for if that were the case the entire expanse between the limits of potentiometer 89 would have to be divided over the full capacity of the load cell system 31. However, by providing a nine tap resistor 67 and the additional adjustable scale potentiometer 89 it is seen that only ten percent of the full capacity load voltage need be counterbalanced by potentiometer 89 for any given loading conditions. That is, the ten range steps provided by the nine tap positions of multitap resistor 67 and the final tap, so to speak, provided by adjustable scale potentiometer 89, enables me to increase the system's sensitivity in that at any given time scale potentiometer 89 would only have to accommodate a fraction of the load capacity of the scale system, and assuming that a scale capacity of 100,000 pounds was necessary it follows that scale potentiometer 89 and dial 96 would be used to register only 10,000 pounds or 10% of the full load capacity. This arrangement would obviously be a vast improvement in accuracy and sensitivity over a system which would require a dial chart to read the full 100,000 pounds. Accordingly, a great increase in sensitivity is achieved by using a load voltage balancing arrangement wherein the scale potentiometer 89 and auxiliary load mechanism 67 (the range step potentiometer or multitap resistor) conjointly provide enough counterbalancing voltage to oppose the live load portion of the voltage generated by the load cell. Therefore, the scale potentiometer 89 now will not have to oppose all of the voltage generated by the load cell but only a small fraction thereof, depending upon the amount of auxiliary load capacity available.

It should of course be appreciated that the load cell can be changed to be able to accommodate various upper limits of load. In this case I have arbitrarily assumed a capacity of 100,000 pounds, and since there are commercially available load indicating pointer and chart assemblies that are capable of accurately handling 10,000 pounds it follows that I will require ten range steps to accommodate the entire 100,000 pounds. It should also be appreciated that the voltage function generated by load translator 31 may deviate from a linear relationship with respect to the load as shown in FIG. 2. Accordingly, it does not follow that the multiple tap resistor 67 and the adjustable potentiometer 89 will be set to provide equal increments of counterbalancing voltage for different tap settings. Only after the voltage function which will be generated by translator 31 is known, by information supplied by the manufacturer or by a trial basis, will the incremental voltage changes be known. For example, referring to FIG. 2 for purposes of explanation only and not to be construed as indicative of actual load voltage representations, it may turn out that the load cell will yield 4.5 millivolts of voltage for the first 10,000 pounds, 8.5 millivolts for 20,000 pounds, 12 millivolts for 30,000 pounds, . . . and 30 millivolts for 100,000 pounds. Obviously, this is not a linear function and it would not be accurate to position the plurality of taps on resistor 67 to yield equal increments of voltage for selectively higher or lower changes therein. From the above it is also clear that some means must be provided to insure that the scale potentiometer 89 will have the correct voltage differential thereacross for the particular range step then in operation. Specifically, since for the first 10,000 pounds the full dial reading of chart 96 must be divided over 4.5 millivolts, whereas it will have to accommodate 4 millivolts for the next 10,000 pounds, and 3.5 for the following 10,000 pounds, etc., some means must be provided to change the voltage across adjustable potentiometer 89. This is accomplished in my system by the multitapped resistor 78 and deck 80 of double-deck switch 38, for as the tap setting of resistor 67 is changed by deck 36 of double-deck switch 38 a corresponding change in the tap setting of resistor 78 will occur to insure that scale potentiometer 89 will at all times have the correct voltage thereacross. Accordingly, with no range steps placed into operation both decks 36 and 80 will be respectively at the zero taps of resistors 67 and 78, and while in that position adjustable potentiometer 89 will have a voltage thereacross of 4.5 millivolts. Assuming now that amplifier 91 continues to develop an error signal of a given phase and magnitude to thereby indicate that the balancing voltage is not sufficiently large enough to counterbalance the load signal, servomotor 92 will therefore drive differentially positionable arm 87 of adjustable means 89 toward its upper limit of travel. Mounted substantially at the terminal positions of adjustable means 89 are normally inoperative switches 101 and 102. Switches 101 and 102 are operable by differentially positionable arm 87 being driven respectively to either its maximum or minimum voltage indicating positions by servomotor 92 in response to the error signal from error detector amplifier 91. I have provided, upon the closing of switches 101 or 102, let us assume that it is 101, for automatic scale capacity changing circuitry 94 to come into effect. The actual structure of the scale changing circuitry 94 is not important and may be the type described in the above U.S. Patent No. 2,944,808. However, for the time being, suffice it to say that circuitry 94 is effective to step bidirectional switch 38 to its next succeeding tap, and in this case to tap number 1. Also since the scale potentiometer voltage adjusting resistor 78 is conjointly controlled by switch 80 it too will be stepped to tap position 1. It is thus evident that the incremental voltage across scale potentiometer 89 with switch 38 set at tap position zero must be able to be replaced by that voltage which is available at tap number 1 of resistor 67 when switch 38 is stepped thereto. Accordingly the resistance between taps of resistor 78 must be selected so that with a zero tap selection by switch 80 a voltage equal to the voltage available at tap number 1 of resistor 67 will be available across adjustable means 89. Further, upon selection of tap number 1, by the stepping of switch 38, the resistance then afforded by resistor 78 must be varied to insure that the voltage across potentiometer 89 will be equal to the incremental rise in voltage which is available at tap number 2 of resistor 67. This procedure is followed for all of the successive tap positions and accordingly the resistance currently switched into circuit by switch 80 must be such to insure that the voltage across adjustable means 89 is equal to the incremental voltage available at the next succeeding tap of resistor 67. Of course, the last increment of voltage necessary to accommodate the final step of load is supplied by the adjustable means 89 itself. Accordingly, in keeping with our hereinbefore mentioned example, the voltage available at tap 1 of resistor 67 is 4.5, an additional 4.0 is added by the movement of switch 36 to tap 2 for a total voltage of 8.5 millivolts thereat, etc.

Also, range step registering means 99, which I have shown in FIG. 1 in block diagram form and which may comprise any of the well-known devices, see for example the above U.S. Patent No. 2,944,808, is provided to indicate 10,000 pounds for each tap position stepped off by switch 38. Furthermore, while I have shown unit 99 to be operated conjointly with switch 38 it should be understood that it could be operated from any of a number of different positions. Unit 99 is operable to register zero pounds with switch 38 set at tap zero, 10,000 pounds for a setting at tap number 1, 20,000 pounds for tap setting two, etc. In addition dial 96 is operable to reflect the fractional weight counterbalance by adjustable means 89. Therefore if a weight of say 95,000 pounds were placed upon the scale platform, the load cell voltage would result in switch 38 being stepped to tap number 9, and indicator 99 would accordingly register 90,000 pounds of unit weight. Further adjustable means 89 would be positioned by servomotor 92 to supply a balancing voltage for the remaining 5,000 pounds and accordingly arm 95 which is also driven by servomotor 92 will indicate the 5,000 pounds difference. The total weight will then be the sum of these two weight indications or 95,000 pounds.

Therefore, in my example, since resistor 67 has nine fixed taps it along with scale potentiometer 89 will allow the full capacity of the load cell to be divided over ten steps. Accordingly, scale potentiometer 89 will only have to accommodate a fraction of the capacity of the load cell at any given time, and the zero to full chart indication of dial 96 can read this amount of load with greater accuracy.

Looking at my error detecting amplifier it should be mentioned that, similar to the system described in the hereinabove mentioned patent, amplifier 91 is connected in circuit with the voltage generated by the load cell and the counterbalancing voltage generated by the quadrature circuit 32, the tare balancing circuit 33, the scale range circuit 34, and the span adjust circuit 35. Accordingly, as the counterbalancing voltage is varied to equal that of the load cell, and since it is 180 electrical degrees out-of-phase therewith, amplifier 91 will sense the resulting null to stop supplying an energizing voltage to the excitation coil of servomotor 92. This prevents any further movement of differentially positionable arm 87, as well as in switches 38 and 39. It can thus be seen that amplifier 91 functions as an error detection amplifier and furnishes a voltage which has a magnitude that varies in accordance with the difference of the two signals applied thereto, and which has a phase which is the same as the phase of the larger magnitude signal.

As shown in FIG. 1, the amount of opposing voltage contributed to the counterbalancing circuit by potentiometer 89 is determined by the position of its movable arm 87. In turn the position of arm 87 is controlled and driven by servomoter 92 by way of connection 97. Connection 97 also conjointly controls the position of indicator 95 relative to the stationary load indicating chart 96. Therefore, so long as there is an unbalance between the voltage of the load cell and the counterbalancing voltage (in either a high or low direction) servomotor 92 will be operable to vary the voltage contributed by scale potentiometer 89. The amount of counterbalancing voltage contributed by potentiometer 89 is registered upon the dial 96 in terms of weight.

Furthermore, as selectively positionable arm 87 approaches either terminal of potentiometer 89, indicating that more counterbalancing voltage is needed if terminal switch 101 is approached or less voltage is necessary if terminal switch 102 is approached, a range stepping means must be initiated to respectively step in or out the next immediate fixed tap of range resistor 67. This will be described in more detail later. At the same time the amount of range steps, or unit weights, supplied to the counterbalancing circuit by the multitap resistor 67 is registered in the unit weight indicator 99. Accordingly, the total weight applied to the load cell is the sum of the indications at register 99 and dial 96. Of course, an automatic print out mechanism can also be used to totalize and print out the applied weight.

Furthermore, since as indicated above the output voltage generated by the load cell may assume any of a plurality of voltage functions, the functions normally taking either the $+.1\%$, $-.1\%$, or zero waveforms as indicated at FIG. 2, it follows that the possible nonlinearity of the load cell voltage must also be taken into account. This is an important factor not only because of the possibility of error which can result in the weight indication if the counterbalancing voltage is not of substantially the same function as that of the load cell, but also in assuring that scale potentiometer 89 will have the correct incremental voltage thereacross in accordance with the scale capacity setting of multitapped resistors 67 and 78.

Specifically, from a consideration of the variety of linear functions that any given translator may generate it is obvious that the accuracy of the weighing system depends upon the counterbalancing voltage having the same linearity function as that of the translator. To dramatically bring this out, and taking the extreme example, if the load cell generates a positive $(+)$ linearity function, whereas the counterbalancing voltage generates a negative $(-)$ linearity function, see FIG. 2, and further assuming that a 50,000 pound load was being applied, it can be seen from FIG. 2 that the load cell would be generating a voltage having an 18 millivolt magnitude. Now in order for the assumed negative counterbalancing voltage to reach an 18 millivolt magnitude an indication of approximately 79,000 pounds would be registered on unit weight indicator 99 and chart 96. From this example it can be seen that an error of over 20,000 pounds would result. Accordingly the necessity for the counterbalancing linearity function to substantially match that of the load cell in order to assure accurate load readings is obvious.

The combining of simple electrical components to approximate any desired function is well-known, see for example chapter five of the text Electronic Instruments from the Radiation Laboratory Series, published by Mc-Graw-Hill Book Company, Inc., 1948. In this invention I have taken advantage of the well-known fact that the error produced by the loading a potentiometer having a resistance in series with the excitation voltage will result in the generation of a series of linearity functions at the output terminal of the potentiometer in accordance with the amount of loading and the value of the series resistance. For a detailed description of the manner of generating parabolic-shaped output functions by the loading of the potentiometer, reference is made to pages 95 through 100 of the last mentioned text as well as to the article entitled "Here Is a Short Cut in Compensating Pot Loading Errors" by J. Gilbert, which appeared in the February, 1955 issue of Control Engineering. In accordance with the procedure outlined in the reference articles I am able, by making series resistance 63 equal to approximately 4,000 ohms, to make resistance 63 equivalent to the resistor labeled $c$ in the Control Engineering article, and using a large value for loading resistance 68, which is equivalent to the resistor labeled $a$ in the article, to obtain a loading error curve which approximates a parabola having its vertex as its most positive point.

Accordingly since the loading error curves which result from the use of resistors 63, 68 and 69 are all parabolas having their apexes as their most positive points it is necessary to locate the taps on resistor 67 so that it has a negative linearity error which substantially conforms to the negative $(-)$ linearity function generated by the load cell built into it. Therefore if the voltage from the zero tap to the number 1 tap is designated $E_1$, the voltage from tap number 1 to tap number 2 designated as $E_2$, etc., and the voltage between the zero and number 9 tap designated as voltage E and further if E represents the total voltage across the resistor 67, the taps are so located so that:

$E_1/E = 11.076\%$ of the total voltage,
$E_2/E = 22.160\%$,
$E_3/E = 33.253\%$,
$E_4/E = 44.356\%$ ..., and
$E_8/E = 88.853\%$.

The total resistance of multiple tap resistor 67 is made equal to 90 ohms. In accordance with the above conditions and tap settings the multi-tapped resistor 67 will generate a curve having a negative linearity function which substantially matches, or fits, the negative (—) linearity function of the load cell, as shown in FIG. 2. Then by selectively switching load resistors 68 and 69 across the tap point, by switch 37, the linear curve (0) and the positive linearity function (+) can be obtained. Specifically, by switching in the 20 kilohms loading resistor 69 across the tap point the linearity curve labeled 0 in FIG. 2 results, whereas by switching in the 10 kilohms loading resistor 68 the positive linearity function labeled + in FIG. 2 is obtained. Therefore, from a knowledge that the linearity function of translators generally fall within the three curves shown in FIG. 2 it is possible by employing my curve matching counterbalancing to accurately match the counterbalancing voltage to the linearity function of any translator by a simple setting of switch 37 to the +, 0, or —terminal, respectively numbered 72, 73 and 74, and thereby obtain an accurate determination of the load.

Also to insure that the scale potentiometer has the correct voltage across it for different scale capacities as well as for the particular type of translator being employed +, — or 0, I have provided a second deck 79 for switch 39. As shown in FIG. 1, deck 79 has associated therewith contacts 82, 83 and 84 which respectively represent the —.1%, 0, and +.1% type translators. Further, since switch 79 is the second deck of switch 39 it follows that the setting thereof will be in accordance with that of switch 37. Therefore after it has been determined that the particular translator in this load responsive system is +, — or 0 a single setting of switch 39 is effective to set both switches 37 and 79 to the correspondingly desired terminal. Furthermore, the multitapped scale potentiometer voltage changing resistor 78 and switches 79 and 80 are effective to provide the proper increments of voltage at potentiometer 89 for any type of translator. At FIG. 2 it is seen that the voltage increments for a straight line voltage function, waveform zero, must be equal, whereas the voltage increments for a positive translator must provide successfully decreasing increments to potentiometer 89, and for a negative translator the voltage across potentiometer 89 must be incrementally increasing for successively increasing scale capacities. Accordingly, as shown in FIG. 1, assuming that the load cell has a straight line response, switch 39 will be stepped so that the deck 37 was set to zero terminal 73 and deck 79 will be set at zero terminal 83. Therefore, as the scale capacity of the system is changed, by the action of scale capacity driving means 94, in response to the error signal developed by amplifier 91 driving differentially movable arm 87 to its upper limit and thereby closing switch 101, switch 38 will be stepped in a balancing direction. Therefore, deck 36 of switch 38 will be stepped along its nine tap settings, and also deck 80 will likewise be stepped. Accordingly, assuming that switch 38 is stepped in a tap increasing direction it can be seen that switches 36 and 80 will advance from tap zero to tap 1, then to tap 2 . . . , etc., until the correct scale capacity has been obtained. As switch 80 is stepped along it can be seen that the voltage across potentiometer 89 will remain constant. However if switch 79 had been set to terminal 82 the voltage across potentiometer 89 would be changing in an increasing direction as switch 38 was varied in a 0 to 9 tap setting position, whereas the opposite effect would result if switch 79 had been set to terminal 84.

As can be appreciated from the above explanation, I have achieved a considerable saving of time in order to calibrate my system to assure that the voltage generated by the counterbalancing network corresponds in magnitude and shape to the transducer voltage. All that is necessary is to know the characteristics of the load cell transducing system, that is whether it is +.1%, —.1%, or 0, and to set the double-deck switch 39 to the corresponding terminal. Then since we know that the response curves are of similar shapes, to insure that the voltage waveforms are of equal magnitude we can apply a single unit weight of load to the load cell and set the first tap of scale capacity changing resistor 67 to a corresponding value by a change in the resistance of potentiometers 61 and 62. Accordingly, since all of the range step taps are fixed in relationship to each other it follows that by setting the first tap to its proper voltage that a proportional change will result at each of the eight other taps. A similar procedure is followed in order to insure that with the double-deck switch 38 set at range step zero that the scale potentiometer 89 will have a voltage drop equal to the voltage generated by the load cell for one unit weight of load. By insuring that the voltage response curve of the load cell, and that generated by the counterbalancing voltage system are coincident at the zero load point and at the first tap it follows that the curves will either fall into exact alignment over the entire linearity functions, or that the degree of non-alignment, which would be greatest at the terminal portion of the curves will be within acceptable standards.

The weighing system and control set forth above are illustrative of the invention; moreover, it is to be appreciated that systems employing different forms of electrical and mechanical translators in one or more of the load sensing devices or other forms of counterbalancing voltage generating means are within the spirit of this invention.

Also whereas I have described a preferred embodiment of my invention having 10 range steps it should of course be appreciated that more or less numbers of steps may be provided and still fall within the scope of my invention. For example resistors 67 and 78 may be provided with say four taps instead of nine as shown. Since a considerable range of equivalents will occur to one skilled in the art from the above disclosure, the scope of this invention is intended to embrace such equivalents and this description is not to be read as placing limitations thereon.

Having described the invention, I claim:

1. A weighing scale comprising, in combination, transducer means for generating an output voltage proportional to load applied to the scale, adjustable means in circuit with the transducer means for supplying a balancing voltage in opposition to the output voltage, servo means in circuit with both said means for altering the adjustable means in a balancing direction in response to differences between said voltages, multi-tapped means having associated switch means for adding increments of voltage to the balancing voltage to increase the capacity of the scale, and selectively operable voltage linearity curve shaping means in circuit with said multi-tapped means for altering the voltage linearity function thereof to substantially conform to the voltage linearity function of said transducer means, said voltage linearity curve shaping means including first impedance means in series with said multi-tapped means for substantially matching said output and balancing voltages in one mode of operation wherein a first linearity type of transducer means is employed and selectable impedance means having associated switch means for placing the selectable impedance means in parallel with the multi-tapped means, the parallel combination of the selectable impedance means and the multi-tapped means being in series with said first impedance means, for substantially matching said output and balancing voltages in a second mode of operation wherein a second linearity type of transducer means is employed.

2. A weighing scale in accordance with claim 1 wherein the multi-tapped means includes a multi-tapped resistor in circuit with the adjustable means and connected across a source of potential and potentiometer means is provided for adjusting the potential of the source in accordance with the output of the transducer means.

3. A weighting scale according to claim 2 characterized in that a second multi-tapped resistor is connected in series with said adjustable means and voltage varying means is provided which is associated with said second multi-tapped resistor to establish the correct voltage across said adjustable means for the particular scale capacity setting.

4. A weighing scale comprising, in combination, transducer means for generating an output voltage proportional to load applied to the scale, adjustable means in circuit with the transducer means for supplying a balancing voltage in opposition to the output voltage, servo means in circuit with both said means for altering the adjustable means in a balancing direction in response to differences between said voltages, multi-tapped means including a plurality of multi-tapped fixed resistors for adding increments of voltage to the balancing voltage to increase the capacity of the scale, a first resistor in series with the multi-tapped fixed resistors for altering the voltage linearity function of the multi-tapped fixed resistors to substantially conform to the voltage linearity function of a first linearity type of transducer means, and a second resistor having associated switch means for placing the second resistor in parallel with the multi-tapped fixed resistors for altering the voltage linearity function of the multi-tapped fixed resistors and the first resistor in series with the multi-tapped fixed resistors to substantially conform to the voltage linearity function of a second linearity type of transducer means.

5. A weighing scale comprising, in combination, transducer means for generating an output voltage proportional to load applied to the scale, adjustable means in circuit with the transducer means for supplying a balancing voltage in opposition to the output voltage, servo means in circuit with both said means for altering the adjustable means in a balancing direction in response to differences between said voltages, multi-tapped means having associated first switch means for adding increments of voltage to the balancing voltage to increase the capacity of the scale, and selectively operable voltage linearity curve shaping means in circuit with said multi-tapped means for altering the voltage linearity function thereof to substantially conform to the voltage linearity function of said transducer means, said voltage linearity curve shaping means including first impedance means in series with said multi-tapped means for substantially matching said output and balancing voltages in one mode of operation wherein a first linearity type of transducer means is employed and selectable impedance means having associated second switch means for placing the selectable impedance means in parallel with the multi-tapped means by way of said first switch means for substantially matching said output and balancing voltages in a second mode of operation wherein a second linearity type of transducer means is employed.

6. A weighing scale comprising, in combination, transducer means for generating an output voltage proportional to load applied to the scale, adjustable means in circuit with the transducer means for supplying a balancing voltage in opposition to the output voltage, servo means in circuit with both said means for altering the adjustable means in a balancing direction in response to differences between said voltages, multi-tapped means having associated switch means for adding increments of voltage to the balancing voltage to increase the capacity of the scale, and selectively operable voltage linearity curve shaping means in circuit with said multi-tapped means for altering the voltage linearity function thereof to substantially conform to the voltage linearity function of said transducer means, said voltage linearity curve shaping means including first means combined with said multi-tapped means for substantially matching said output and balancing voltages in one mode of operation wherein a first linearity type of transducer means is employed and second means selectively combinable with said first means and with said multi-tapped means for substantially matching said output and balancing voltages in a second mode of operation wherein a second linearity type of transducer means is employed.

References Cited by the Examiner

UNITED STATES PATENTS

| | | | |
|---|---|---|---|
| 2,733,911 | 2/1956 | Thruston | 177—211 |
| 2,936,165 | 5/1960 | Thorsson | 177—211 |
| 2,938,701 | 5/1960 | Thorsson et al. | 177—211 |
| 2,944,808 | 7/1960 | Spademan | 177—211 |
| 3,066,752 | 12/1962 | Spademan | 177—211 |

LEO SMILOW, *Primary Examiner.*